(12) United States Patent
Silvestri

(10) Patent No.: US 10,165,394 B2
(45) Date of Patent: *Dec. 25, 2018

(54) LOCATION ACCURACY FOR PROXIMITY SERVICES

(71) Applicant: AT&T Mobility II LLC, Atlanta, GA (US)

(72) Inventor: Richard J. Silvestri, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/675,843

(22) Filed: Aug. 14, 2017

(65) Prior Publication Data

US 2017/0347230 A1  Nov. 30, 2017

Related U.S. Application Data

(63) Continuation of application No. 14/825,622, filed on Aug. 13, 2015, now Pat. No. 9,736,631.

(51) Int. Cl.
   *H04W 4/02* (2018.01)
   *H04W 4/20* (2018.01)
   *H04W 4/80* (2018.01)

(52) U.S. Cl.
   CPC ............... *H04W 4/02* (2013.01); *H04W 4/20* (2013.01); *H04W 4/80* (2018.02)

(58) Field of Classification Search
   CPC .................................................. H04W 4/02
   (Continued)

(56) References Cited

U.S. PATENT DOCUMENTS 8,526,391 B2   9/2013  Issakov et al.
8,755,816 B2   6/2014  Kangas et al.
(Continued)

OTHER PUBLICATIONS $3^{rd}$ Generation Partnership Project, Technical Specification Group Services and System Aspects, Proximity-based services (ProSe), Stage 2, Release 12; 3GPP TS 23.303 V12.5.0; Jun. 2015.
(Continued)

*Primary Examiner* — Michael T Vu
(74) *Attorney, Agent, or Firm* — Hartman & Citrin LLC

(57) ABSTRACT

Concepts and technologies are described herein for improving location accuracy for proximity services. According to one aspect of the concepts and technologies disclosed herein, an expression application server can receive an expression message generated by a Third Generation Partnership Project ("3GPP") proximity service ("ProSe")-enabled application executing on a mobile device. The expression message includes an expression code and a location tag. The expression application server can analyze the expression message to determine whether increased granularity is desired for use in determining an expression match to the expression code. In response to determining that the increased granularity is desired, the expression application server can request additional location information from a location platform. The expression application server can receive the additional location information from the location platform. The expression application server also can enhance the expression match with the additional location information to provide the increased granularity to the mobile device.

20 Claims, 7 Drawing Sheets

(58) Field of Classification Search
USPC .......................................... 455/456.1–456.6
See application file for complete search history.

(56) References Cited

U.S. PATENT DOCUMENTS

| | | |
|---|---|---|
| 8,768,289 B2 | 7/2014 | Siomina et al. |
| 8,805,410 B2 | 8/2014 | Al-Mufti et al. |
| 8,908,586 B2 | 12/2014 | Gerstenberger et al. |
| 8,914,043 B2 | 12/2014 | Zelinka |
| 8,923,886 B2 | 12/2014 | Wigren et al. |
| 8,971,920 B2 | 3/2015 | Jiang et al. |
| 2011/0117924 A1 | 5/2011 | Brunner et al. |
| 2014/0080506 A1 | 3/2014 | Siomina |
| 2014/0235266 A1 | 8/2014 | Edge et al. |
| 2014/0274111 A1 | 9/2014 | Edge et al. |
| 2014/0335889 A1 | 11/2014 | Witych |
| 2015/0119065 A1 | 4/2015 | Shaw et al. |
| 2016/0189514 A1 | 6/2016 | Todasco |
| 2016/0283979 A1* | 9/2016 | Chatterton ......... G06Q 30/0261 |
| 2016/0300185 A1* | 10/2016 | Zamer ................ G06Q 10/0834 |

OTHER PUBLICATIONS

U.S. Office Action dated Sep. 1, 2016 in U.S. Appl. No. 14/825,622.
U.S. Notice of Allowance dated Mar. 20, 2017 in U.S. Appl. No. 14/825,622.

\* cited by examiner

LOCATION ACCURACY FOR PROXIMITY SERVICES

CROSS-REFERENCE TO RELATED APPLICATIONS

This application is a continuation of and claims priority to U.S. patent application Ser. No. 14/825,622, entitled "Location Accuracy for Proximity Services," filed Aug. 13, 2015, now U.S. Pat. No. 9,736,631, which is incorporated herein by reference in its entirety.

BACKGROUND

Proximal discovery is the ability for devices to passively and continuously search for relevant value in physical proximity thereof. For example, a device can utilize location technologies to search for and detect other devices in proximity that utilize the same application. Presently, BLUETOOTH, WI-FI, radio frequency identification ("RFID"), and other like technologies are used for proximal discovery. These technologies exhibit several disadvantages. For example, these technologies offer low capacity, require the expense of technology-specific hardware (e.g., dedicated BLUETOOTH, WI-FI, and/or RFID hardware components), and reduce device battery life, among other disadvantages.

Long-Term Evolution ("LTE") DIRECT is a device-to-device communications technology that utilizes licensed LTE spectrum for proximal discovery. LTE DIRECT is available from QUALCOMM TECHNOLOGIES, INC. and leverages the global LTE standard as part of Third Generation Partnership Project ("3GPP") Release 12. LTE DIRECT also can be used on unlicensed spectrum. LTE DIRECT is superior to the competing technologies described above in many ways. LTE DIRECT offers increased battery life, greater radio frequency ("RF") coverage, user scalability, and LTE world-wide adoption. LTE DIRECT, however, has several drawbacks, including granularity and accuracy of location data. In particular, LTE DIRECT has a major drawback in that two or more devices in "proximity" is approximated by the devices being in the same cell tower sector, resulting in a relatively large area of approximately 500 meters of proximity. This is a typical value but is impacted by LTE RF sector size, RF propagation, timing, and other factors. This drawback limits the practical use cases and commercialization of LTE DIRECT to use cases that do not require high location accuracy, especially those use cases that require more granularity than 500 meters.

LTE DIRECT utilizes LTE proximity and public safety standards defined in 3GPP Release 12 to work with an LTE DIRECT-defined expression server that facilitates proximal discovery of users. "Users" in LTE DIRECT are LTE-based devices and applications with common interests. The interests are represented in signals called "expressions." Expressions are sent to and translated by the expression server. Expressions can be private and discreet, such as those targeted securely for certain audiences only. Expressions can be public, such as those transmitted so that any application can receive them. Public expressions are a common language available to any application to discover each other. Public expressions exponentially expand the field of value for proximity applications.

SUMMARY

Concepts and technologies are described herein for improving location accuracy for proximity services. According to one aspect of the concepts and technologies disclosed herein, an expression application server can receive an expression message generated by a Third Generation Partnership Project ("3GPP") proximity service ("ProSe")-enabled application executing on a mobile device. The expression message can include an expression code and a location tag. The expression application server can analyze the expression message to determine whether increased granularity is desired for use in determining an expression match to the expression code. In response to determining that the increased granularity is desired, the expression application server can request additional location information from a location platform. The expression application server can receive the additional location information from the location platform. The expression application server also can enhance the expression match with the additional location to provide the increased granularity to the mobile device.

An "expression" is a beacon signal broadcast by ProSe-enabled devices, such as the mobile device introduced above, on a periodic basis (e.g., every 10 seconds). In some embodiments, the expression code includes a restricted expression code associated with a restricted expression. A restricted expression, also referred to as "direct or private expression," is an expression targeted securely for certain audiences only. In other embodiments, the expression code includes an open expression code associated with an open expression. An open expression, also referred to as a "public expression," is an expression targeted for all audiences.

In some embodiments, the increased granularity includes one or more levels of proximity that is/are increased from a proximity of approximately 500 meters provided via LTE DIRECT technology. For example, a first level of proximity might be less than 100 meters, a second level of proximity might be less than 50 meters, a third level of proximity might be less than 10 meters, a fourth level of proximity might be less than 1 meter, and so on. The number of levels, the difference between levels, and other parameters of the specific proximity accuracy can be modified by a service provider, a user, or any other entity involved in the implementation of the concepts and technologies disclosed herein.

In some embodiments, the location tag includes an indication that the additional location information should be obtained. For example, the location tag can include a "yes" tag or a "no" tag indicative of whether or not a location difference request should be generated by the expression application server and sent to the location platform to obtain a location difference for use as at least part of the additional location information. In some embodiments, the location tag identifies a specific proximity accuracy requested by the ProSe application.

In some embodiments, the location tag includes one or more bits. For example, a "0" bit can be added to an expression code to indicate a "no" tag or a "1" bit can be added to an expression code to indicate a "yes" tag. As another example, a triplet of "000" can be added to an expression code to indicate that additional granularity is not needed; a triplet of "001" can be added to an expression code to indicate a first level of proximity of less than 100 meters; a triplet of "010" can be added to an expression code to indicate a second level of proximity of less than 50 meters; a triplet of "100" can be added to an expression code to indicate a third level of proximity of less than 10 meters; or an additional triplet of "101" can be added to an expression code to indicate a fourth level of proximity of less than 1 meter, and so on. In these embodiments, the expression code and the location tag can be made to fit into the LTE DIRECT defined field for expressions, which is presently fixed at 160 bits. For example, the expression code can include 157 bits and the location tag can include 3 bits for a total number of bits equal to 160, which is the maximum number of bits for LTE DIRECT expressions. It is contemplated, however, that the LTE DIRECT defined field for expressions could be extended to support additional bits. In such implementations, the expression code can be 160 bits and the location bits can be added. Alternatively, a new LTE DIRECT field could be added to include the location tags. In some embodiments, the location tag includes a modified bit of a plurality of bits in the expression code.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
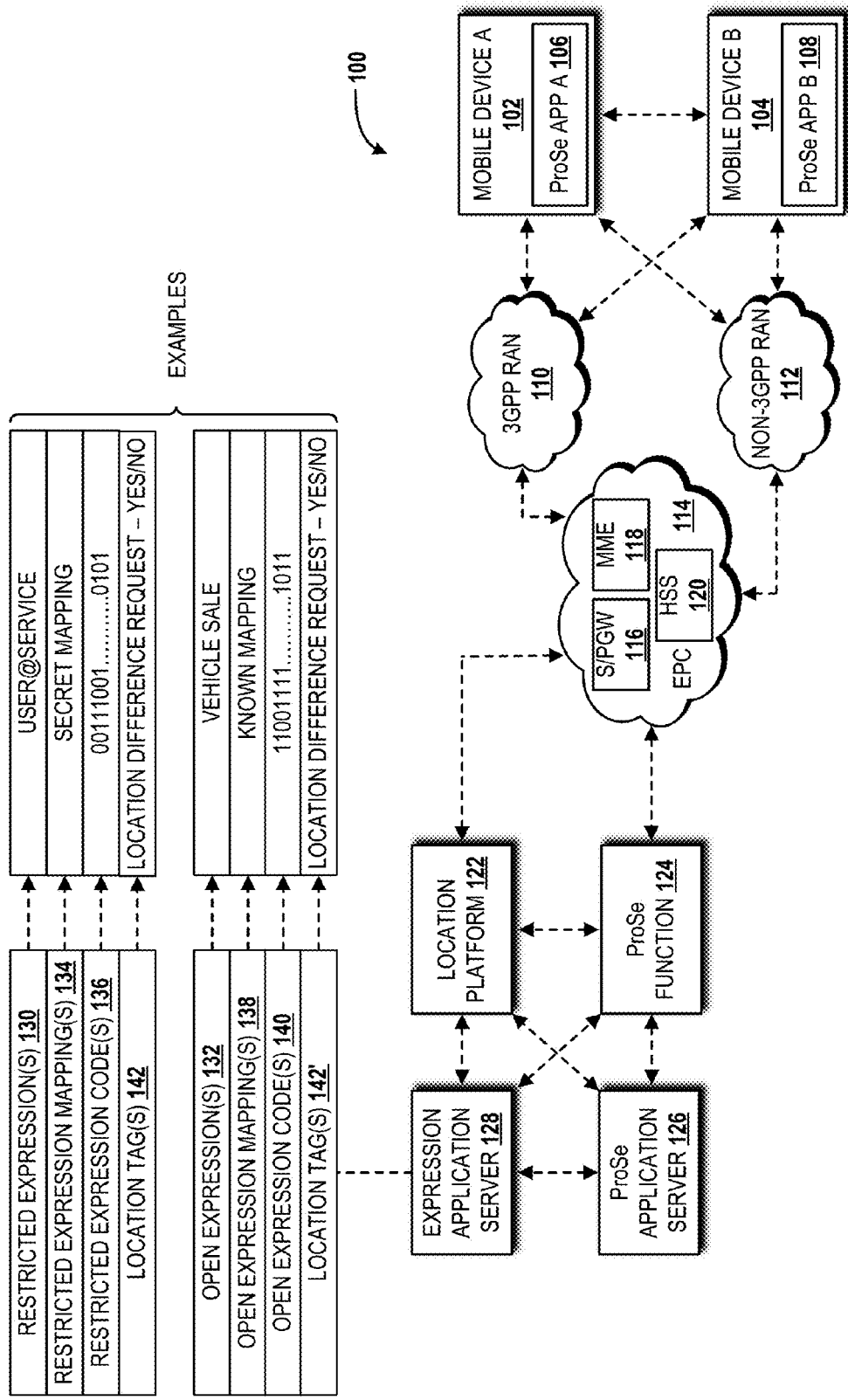
FIG. 1 is a block diagram illustrating aspects of an illustrative operating environment for various concepts disclosed herein.

The concepts and technologies disclosed herein enhance the location accuracy of Long-Term Evolution ("LTE") DIRECT, available from QUALCOMM TECHNOLOGIES, INC. LTE DIRECT currently provides an accuracy of approximately 500 meters. This low accuracy renders LTE DIRECT uncompetitive to other proximity technologies based upon BLUETOOTH, WI-FI, RFID, and similar technologies. LTE DIRECT, however, is superior to these technologies in other aspects, especially in battery life, RF coverage, user scalability, and LTE world-wide adoption. Adding high location accuracy to LTE DIRECT removes a major barrier to a valuable portion of the market for proximity services, including social, big data, and advertising markets, where more granular, more accurate location have majority value.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of improving location accuracy for proximity services will be presented.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The illustrated operating environment 100 includes a first mobile device 102 ("mobile device A 102") and a second mobile device 104 ("mobile device B 104"), each configured to execute a proximity services ("ProSe") application—in particular, a first ProSe application 106 ("ProSe APP A 106") to be executed by the mobile device A 102 and a second ProSe application 108 ("ProSe APP B 108") to be executed by the mobile device B 104. The ProSe APP A 106 and the ProSe APP B 108 can enable, for the mobile device A 102 and the mobile device B 104, respectively, ProSe features in accordance with Third Generation Partnership Project ("3GPP") Release 12. In particular, the ProSe APP A 106 and the ProSe APP B 108 can provide a ProSe discovery feature and a ProSe direct communication feature. The ProSe discovery feature can identify that one or more ProSe-enabled device are in proximity. The ProSe direct communication feature can enable establishment of direct communication paths between two or more ProSe-enabled devices. Moreover, the ProSe APP A 106 and the ProSe APP B 108 can provide features in accordance with LTE DIRECT, available from QUALCOMM TECHNOLOGIES, INC. LTE DIRECT is a device-to-device ("D2D") technology that utilizes licensed LTE spectrum for proximal discovery. LTE DIRECT leverages the global LTE standard as defined in 3GPP Release 12, including the ProSe features described above. LTE DIRECT uses LTE sub-frames to facilitate efficient discovery of LTE DIRECT-enabled devices. LTE DIRECT also leverages the LTE network for timing, resource allocation, and user authentication. In some embodiments, the ProSe APP A 106 and the ProSe APP B 108 utilize LTE DIRECT technology and enhancements provided by the concepts and technologies described herein to perform operations. The ProSe APP A 106 and the ProSe APP B 108 can provide proximity services in association with social networking, big data, advertising, and any other use cases that can benefit from the enhancements to LTE DIRECT described herein.

The mobile device A 102 and the mobile device B 104 each may be a cellular telephone, a feature phone, a smartphone, a mobile computing device, a portable television, a portable video game console, other computing device, or any other user equipment ("UE") that is configured to communicate with one or more radio access networks ("RANs"), including, for example, as in the illustrated embodiment, a 3GPP RAN 110 and a non-3GPP RAN 112. Although in the illustrated example the mobile devices 102, 104 are shown as being in communication with one 3GPP RAN (i.e., the 3GPP RAN 110) and one non-3GPP RAN (i.e., the non-3GPP RAN 112), as dual-mode mobile devices, the mobile devices 102, 104 may be in communication with any number of access networks, including networks that incorporate collocated 3GPP and non-3GPP technologies, in essence merging the 3GPP RAN 110 and the non-3GPP RAN 112. Moreover, in some embodiments, at least one of the mobile device A 102 and the mobile device B 104 are instead fixed devices. For example, a department store might have several fixed devices in various departments with each fixed device expressing the department name (e.g., shoes, menswear, kitchen, bath, and the like). In accordance with the concepts and technologies disclosed herein, an expression can be enhanced to match mobile devices, such as operated by shoppers, with department name and proximity (e.g., "shoes"<25 meters).

Each of the access networks, including the 3GPP RAN 110 and the non-3GPP RAN 112, can include one or more service areas (which may also be referred to herein as "cells") having the same or different cell sizes, which may be represented by different cell-types. As used herein, a "cell" refers to a geographical area that is served by one or more base stations operating within an access network. As used herein, a "base station" refers to a radio receiver and/or transmitter (collectively, transceiver) that is/are configured to provide a radio/air interface over which one or more devices, such as the mobile devices 102, 104, can connect to a network. Accordingly, a base station is intended to encompass one or more base transceiver stations ("BTSs"), one or more Node-Bs, one or more eNode-Bs, one or more home eNode-Bs, one or more wireless access points ("APs"), one or more multi-standard metro cell ("MSMC") nodes, and/or other networking nodes or combinations thereof that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves to and from one or more devices, such as the mobile devices 102, 104.

The 3GPP RAN 110 may operate in accordance with one or more mobile telecommunications standards including, but not limited to, Global System for Mobile communications ("GSM"), Code Division Multiple Access ("CDMA") ONE, CDMA2000, Universal Mobile Telecommunications System ("UMTS"), LTE, other current 3GPP cellular technologies, other future 3GPP cellular technologies, combinations thereof, and/or the like. The 3GPP RAN 110 can utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide a radio/air interface to the mobile devices 102, 104. Data communications can be provided in part by the 3GPP RAN 110 using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, 3GPP RAN 110 may be a GSM RAN ("GRAN"), a GSM EDGE RAN ("GERAN"), a UMTS Terrestrial Radio Access Network ("UTRAN"), an evolved U-TRAN ("E-UTRAN"), any combination thereof, and/or the like. For purposes of the concepts and technologies disclosed herein, the 3GPP RAN 110 will be described as an E-UTRAN. Those skilled in the art will appreciate the applicability of E-UTRAN functionality to the concepts and technologies herein. The non-3GPP RAN 112 can be operated in accordance with Worldwide Interoperability for Microwave Access ("WiMAX"), CDMA2000, WWAN, WLAN, fixed networks, and any other non-3GPP technology.

The 3GPP RAN 110 and the non-3GPP RAN 112 can be part of one or more mobile telecommunications networks provided, at least in part, by one or more mobile telecommunications service providers. As used herein, a mobile telecommunications network includes one or more RANs, such as the 3GPP RAN 110 and the non-3GPP RAN 112, and a WWAN, which may include one or more core networks, such as, for example, an evolved packet core ("EPC") network 114 in the illustrated embodiment.

The illustrated EPC network 114 includes a combination serving gateway function and packet data network ("PDN") gateway function ("S/PGW") 116, a mobility management entity ("MME") 118, and a home subscriber server ("HSS") 120. The serving gateway function can serve the mobile devices 102, 104 by routing incoming and outgoing IP packets. The serving gateway function also can provide an anchor point for intra-LTE mobility (e.g., handover between eNodeBs operating within the 3GPP RAN 110) and an anchor point between multiple 3GPP RANs 110. The PDN gateway function interconnects the EPC network 114 and one or more PDNs (not shown). The PDN gateway function also performs IP address/IP prefix allocation, policy control, and charging operations. Although illustrated as a combined entity, the serving gateway function and the PDN gateway function can be independent entities deployed within the EPC network 114. The MME 118 controls signaling related to mobility and security for E-UTRAN access, such as via the 3GPP RAN 110, by the mobile devices 102, 104. The MME can track and page the mobile devices 102, 104 in idle-mode. The HSS 120 is a database that contains user/subscriber information. The HSS 120 also performs operations to support mobility management, call and session setup, user authentication, and access authorization.

The illustrated EPC 114 is in communication with a location platform 122. The location platform 122 can be or can include one or more location systems that provide one or more location services to locate the geographical location of the mobile devices 102, 104. The location platform 122 can operate in accordance with any location protocol. Some example location protocols that might be implemented for use with the concepts and technologies disclosed herein include, but are not limited to, location positioning protocol ("LPP") and secure user plane ("SUPL"). LPP is a point-to-point protocol between a location server (e.g., an evolved serving mobile location center "SMLC" or a SUPL location platform) and the mobile devices 102, 104. Details regarding LPP and SUPL are provided in 3GPP Release 12 and for this reason are not described in further detail herein. Generally, though, the location platform 122 manages positioning for one or more target devices, such as the mobile devices 102, 104, by obtaining measurements and other location information from one or more positioning units, including terrestrial positioning units such as eNodeBs and others such as GPS satellites.

The illustrated EPC 114 also is in communication with a ProSe function 124, which, in turn, is also in communication with the location platform 122. The ProSe function 124 is a logical function that is used for network-related actions for ProSe. In context of the concepts and technologies disclosed herein, the ProSe function 124 is utilized by the operating environment 100 to provide proximity discovery operations so that the mobile devices 102, 104 can discover UEs within proximity, which according to current 3GPP standard, is approximately 500 meters for devices known to be in the same cell sector. Although one ProSe function 124 is illustrated, it is contemplated that multiple ProSe functions 124 can be deployed to accommodate load. The ProSe function(s) 124 can be implemented in accordance with 3GPP Technical Specification ("TS") 23.303 in Release 12. Some general functionality of the ProSe function(s) 124 is described below. Those skilled in the art will appreciate the more detailed explanation of the 3GPP ProSe function from the above-mentioned TS for ProSe. As such, additional details in this regard are not described herein so as not to obscure the novel and nonobvious features of the concepts and technologies disclosed herein for improving location accuracy for ProSe, such as used in LTE DIRECT and like services.

The ProSe function 124 can provision UEs with parameters to be used in ProSe direct discovery and direct communication. The ProSe function 124 can allocate and process the mapping of ProSe application identifiers and ProSe application codes (e.g., the identifiers and codes associated with the ProSe APP A 106 and the ProSe APP B 108). The ProSe function 124 can utilize ProSe-related subscriber data stored in the HSS 120 for authorization to proceed with processing each discovery request. The ProSe-related subscriber data can include an indication of whether a subscriber is authorized to utilize ProSe, including particular ProSe, such as a service that utilizes, at least in part, the concepts and technologies disclosed herein, application IDs that identify ProSe-enabled applications, such as the ProSe APP A 106 and the ProSe APP B 108, and user IDs for users of the ProSe-enabled applications.

The ProSe function 124 is in communication with a ProSe application server 126. The ProSe application server 126 can store ProSe user IDs and ProSe function IDs. The ProSe application server 126 also can map application layer user IDs and EPC ProSe user IDs. Although shown as separate entities, the ProSe function 124 may be implemented together with the ProSe application server 126.

In addition to the functionality described above, the MME 118 can perform additional operations for ProSe. The MME 118 can receive subscription information related to ProSe from the HSS 120. The MME 118 can provide indication to the 3GPP RAN 110 (e.g., embodied as an E-UTRAN) that the mobile devices 102, 104 are authorized to utilize ProSe.

The illustrated operating environment 100 also includes an expression application server 128 in accordance with LTE DIRECT. As used herein, an "expression" is a beacon signal broadcast by ProSe-enabled devices, such as the mobile devices 102, 104, on a periodic basis (e.g., every 10 seconds). An expression is broadcast for all devices in proximity to listen utilizing existing LTE spectrum. Moreover, in accordance with LTE DIRECT, an expression is a 160-bit service layer identifier that represents an identity, a service, an interest, an approximate location, or some combination thereof.

The illustrated expression application server 128 can store two types of expressions—restricted expressions 130 and open expressions 132. The restricted expressions 130, also referred to as direct or private expressions, are expressions targeted securely for certain audiences only. The open expressions 132, also referred to as public expressions, are expressions targeted for all audiences.

Services are mapped to the restricted expressions 130 via restricted expression mappings 134. The restricted expression mappings 134, in some embodiments, are based upon a one-way hash function with a private key to map the restricted expressions 130 to restricted expression codes 136, which can be binary 160-bit expression codes. In the illustrated example, the restricted expressions 130 can include a "user@service" expression specifying a particular user, "user," of a particular service, "service," that utilizes a secret mapping, such as a one-way hash function with a private key, to map the "user@service" restricted expression to the "00111001 . . . 0101" restricted expression code.

Services are mapped to the open expressions 132 via open expression mappings 138. The open expression mappings 138, in some embodiments, are based upon well-known mappings maintained by the expression application server 128 to map the open expressions 132 to open expression codes 140, which also can be binary 160-bit expression codes. In the illustrated example, the open expressions 132 can include "vehicle sale" or other advertising-related information that utilizes a well-known mapping to map the "vehicle sale" open expression to the "11001111 . . . 1011" open expression code.

The restricted expressions 130 and the open expressions 132 (collectively, "expressions 130, 132") can be associated with one or more location tags 142, 142'. The location tags 142, 142' can identify to the expression application server 128 whether additional location information should be obtained to increase the granularity of proximity from the approximately 500 meters provided via LTE DIRECT and other ProSe to greater granularity. The location tags 142, 142' provide additional criteria beyond a match of expression and proximity as defined by LTE DIRECT.

In some embodiments, the location tags 142, 142' can identify a specific proximity accuracy requested, for example, by the ProSe APP A 106 or the ProSe APP B 108. The specific proximity accuracy can be provided in terms of a distance measurement quantified in any unit of distance measurement. For example, the specific proximity accuracy might identify a first level of proximity of less than 100 meters, a second level of proximity of less than 50 meters, a third level of proximity of less than 10 meters, a fourth level of proximity of less than 1 meters, and so on. The number of levels, the difference between levels, and other parameters of the specific proximity accuracy can be modified by a service provider, a user, or any other entity involved in the implementation of the concepts and technologies disclosed herein. Accordingly, the aforementioned examples are merely illustrative and should not be construed as being limiting in any way.

In the illustrated embodiment, the location tags 142, 142' include a "yes" tag or a "no" tag indicative of whether or not a location difference request should be generated by the expression application server 128 and sent to the location platform 122 to obtain a location difference between the location information provided by the ProSe function 124 and the actual location of a UE, such as one of the mobile devices 102, 104. In this embodiment, the specific proximity accuracy is overridden for any additional information available that could be useful to the expression application server 128 in fine tuning the granularity of expression matches.

The location tags 142, 142' can be represented in expression codes, such as the restricted expression codes 136 and the open expression codes 140, in the LTE DIRECT defined field for expressions, which is presently fixed at 160 bits. The location tags 142, 142' can be represented as bits added to the expression codes. For example, a "0" bit can be added to an expression code to indicate a "no" tag or a "1" bit can be added to an expression code to indicate a "yes" tag. As another example, a triplet of "000" can be added to an expression code to indicate that additional granularity is not needed; a triplet of "001" can be added to an expression code to indicate a first level of proximity of less than 100 meters; a triplet of "010" can be added to an expression code to indicate a second level of proximity of less than 50 meters; a triplet of "100" can be added to an expression code to indicate a third level of proximity of less than 10 meters; or a triplet of "101" can be added to an expression code to indicate a fourth level of proximity of less than 1 meter, and so on. For example, the expression code can include 157 bits and the location tag can include 3 bits for a total number of bits equal to 160, which is the maximum number of bits for LTE DIRECT expressions. It is contemplated, however, that the LTE DIRECT defined field for expressions could be extended to support additional bits. In such implementations, the expression code can be 160 bits and the location bits can be added. Alternatively, a new LTE DIRECT field could be added to include the location tags. In other embodiments, existing bits can be earmarked for representation of the location tags 142, 142' and can be modified in a manner similar to the new bits added in the previous embodiment.

Figure 2:
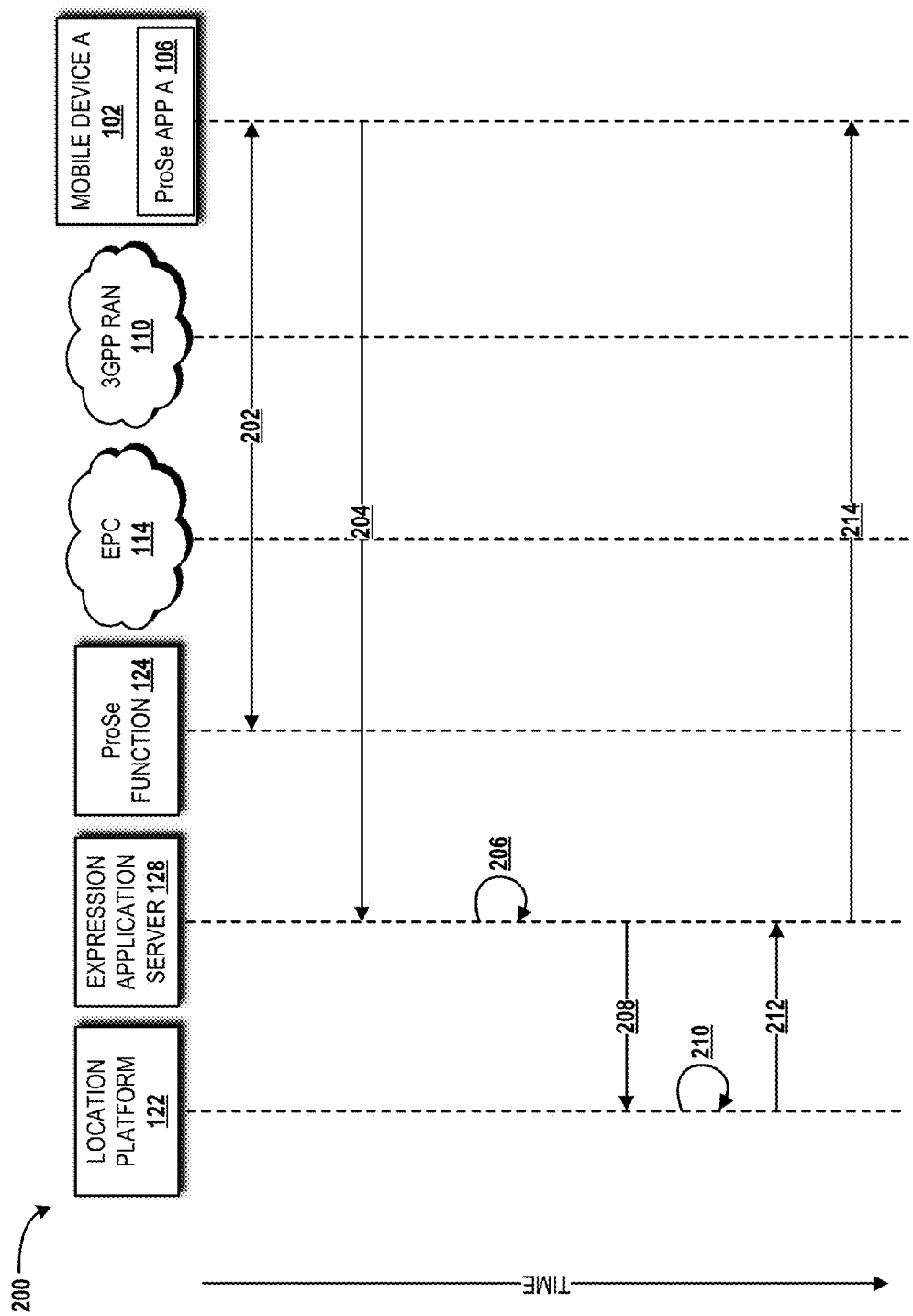
FIG. 2 is a message flow diagram illustrating a message flow for improving location accuracy for proximity services, according to an illustrative embodiment.

Turning now to FIG. 2, a message flow diagram illustrating a message flow 200 for improving location accuracy for proximity will be described, according to an illustrative embodiment. The illustrated message flow 200 includes the mobile device A 102, the ProSe APP A 106, the 3GPP RAN 110, the EPC 114, the ProSe function 124, the expression application server 128, and the location platform 122, all of which are described above in detail with reference to FIG. 1. While connections are shown between certain of the network entities illustrated in FIG. 2, these connections should not be construed as being limiting in any way. Although some of the messages in the message flow 200 appear to traverse multiple network entities between the message source and the message destination, these traversals also should not be construed as being limiting in any way, including requiring messages to traverse the specific entities shown. As such, the message flow 200 should be understood as a simplified version of only some message exchanges between the network entities described herein. It also should be understood that additional message exchanges might take place prior to the messages exchanged in the message flow 200, including, for example, message exchanges in support of authorization and provisioning processes as detailed in 3GPP Release 12.

Prior to describing the message flow 200, a simplified example of current LTE DIRECT functionality will be described. LTE DIRECT uses LTE uplink sub-frames to transmit expressions for discovery of proximal users who have expressed similar interests. The interests each expression represents are not known to the other nearby users until translated by an expressions server, such as the expression application server 128. The 3GPP proximity server in the core network, such as the ProSe function 124 and the ProSe application server 126 operating on or in communication with the EPC 114 in the embodiment illustrated in FIG. 1, provides the proximal matches, typically with users with UEs within 500 meters of each other operating within the same cell sector. Proximity and interest matches are the two-step process current LTE DIRECT provides which then allows various use cases to proceed. For example, two or more LTE DIRECT-enabled devices and/or applications are informed of their proximal and expressions match and can execute further actions based on this information.

The concepts and technologies disclosed herein expand the aforementioned process by, at least in part, providing optional additional criteria beyond the match of expression and proximity. This criteria includes, as described above, a specific proximity accuracy requested by the devices/applications and determined by other location-based technologies or services provided by the location platform 122. This criteria provides a subset of matches that are more accurate than LTE DIRECT alone. As also described above, the optional additional criteria can be implemented via changes to expressions code to add new bits or to modify existing bits. How this additional criteria is integrated within an example LTE DIRECT message flow is now described.

The message flow diagram 200 begins when the mobile device A 102, executing the ProSe APP A 106, communicates with the ProSe function 124 to determine whether any other devices, such as the mobile device B 104, are within proximity, which, according to LTE DIRECT specifications, establishes that the mobile device B 104 is within 500 meters in the same cell sector of the mobile device A 102. This operation is illustrated at 202 in the message flow 200.

In response, the mobile device A 102 generates an expression message 204 directed to the expression application server 128. The expression message 204 includes one of the expression codes (e.g., the restricted expression codes 136 and the open expression codes 140) and one or more of the location tags 142, 142'. The mobile device A 102 sends the expression message 204 to the expression application server 128. The expression application server 128 analyzes, at 206, the expression message 204 received from the mobile device A 102 to determine, based upon the location tag(s) 142, 142', whether or not a location difference request should be generated by the expression application server 128 and sent to the location platform 122 to obtain a location difference between the location proximity information provided by the ProSe function 124 and the actual location of the mobile device A 102. If the expression application server 128 finds no location tags 142, 142', then the message flow can proceed in accordance with LTE DIRECT. If, however, the expression application server 128 finds one or more location tags 142, 142', the expression application server 128 can determine, based upon the location tag(s) 142, 142', whether a location difference request should be generated and, in some embodiments, a level of proximity to be requested in the location difference request. In the illustrated example, the expression application server 128 generates a location difference request message 208 that includes the location difference request and, if applicable, a level of proximity, and sends the location difference request message 208 to the location platform 122.

The location platform 122 receives the location difference request message 208 from the expression application server 128 and determines, at 210, the level of proximity, if applicable, to attempt to obtain for the expression application server 128 in response to the location different request included in the location difference request message 208. The location platform 122 then utilizes one or more location protocols to obtain additional location information to satisfy the level of proximity, if applicable, identified in the location difference request message 208. The location platform 122 can utilize location protocols including, but are not limited to, LPP and SUPL, although other location protocols, including those assisted via GPS and future yet known methodologies also are contemplated. After the location platform 122 obtains additional location information, the location platform 122 generates a location difference response message 212 that includes the additional location information, such as a location difference between the proximity provided by the ProSe function 124 and the location of the mobile device A 102 as identified by the location platform 122. The location platform 122 sends the location difference response message 212 to the expression application server 128.

The expression application server 128 receives the location difference response message 212 from the location platform 122 and generates an enhanced expression match message 214 that identifies any UEs within the level of proximity now known from the additional location information included in the location difference response message 212. The expression application server 128 sends the enhanced expression match message 214 to the mobile device A 102 to inform a user of the mobile device A 102 of nearby matches in accordance with the level of proximity provided by the location platform 122.

Figure 3:
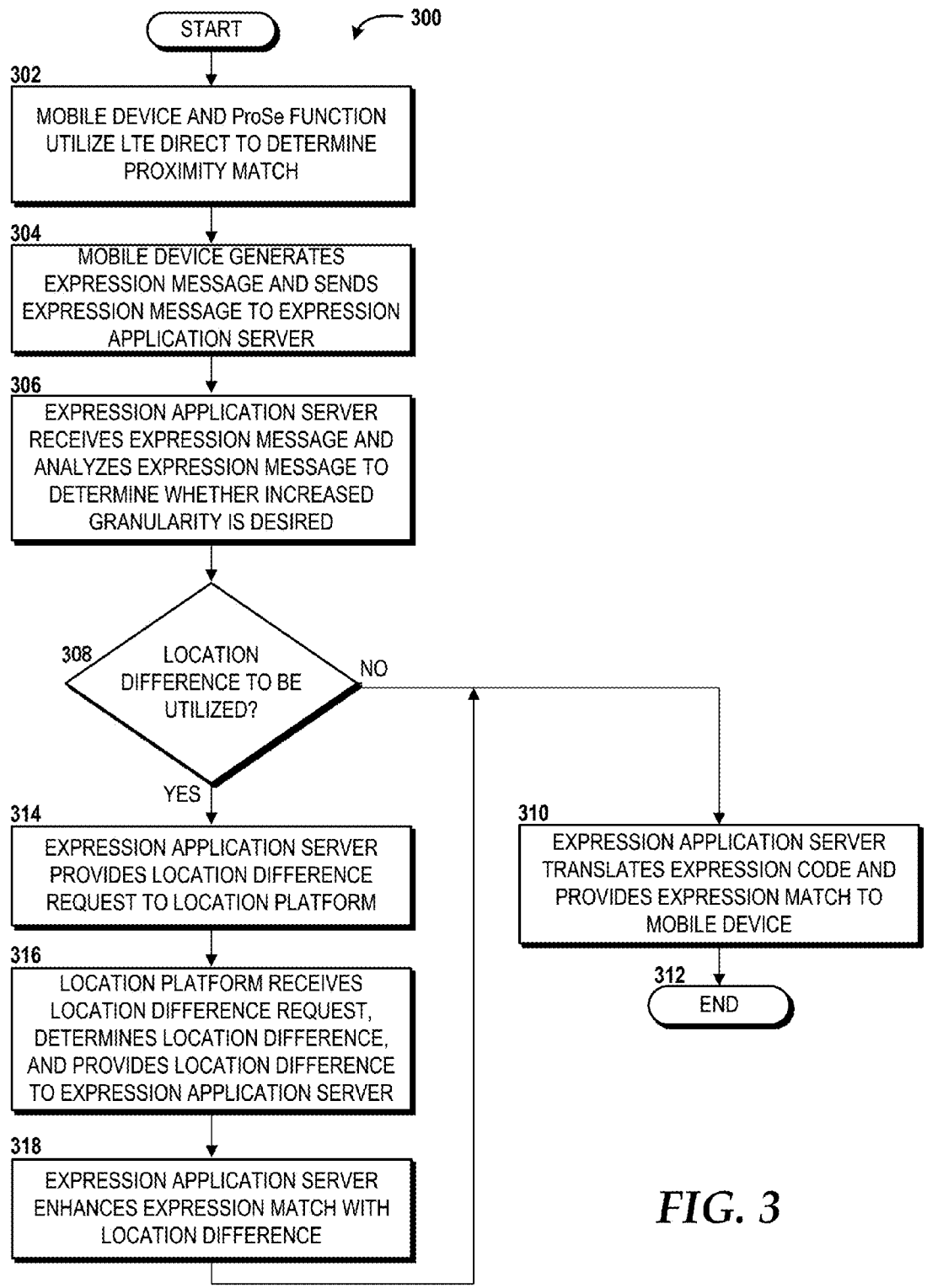
FIG. 3 is a flow diagram illustrating aspects of a method, according to an illustrative embodiment.

Turning now to FIG. 3, a method 300 for improving location accuracy for proximity will be described, according to an illustrative embodiment. It should be understood that the operations of the illustrative methods disclosed herein are not necessarily presented in any particular order and that performance of some or all of the operations in an alternative order(s) is possible and is contemplated. The operations have been presented in the demonstrated order for ease of description and illustration. Operations may be combined, separated, added, omitted, modified, and/or performed simultaneously or in another order without departing from the scope of the subject disclosure.

It also should be understood that the illustrated methods can be ended at any time and need not be performed in their entirety. Some or all operations of the methods, and/or substantially equivalent operations, can be performed by execution of computer-executable instructions included on a computer-readable storage media, as defined below. The term "computer-executable instructions," and variants thereof, as used in the description and claims, is used expansively herein to include routines, application programs, software, application modules, program modules, components, data structures, algorithms, and the like. Computer-executable instructions can be implemented on various system configurations, including single-processor or multi-processor systems, distributed computing systems, mini-computers, mainframe computers, personal computers, hand-held computing devices, microprocessor-based, programmable consumer electronics, combinations thereof, and the like.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 300 will be described, at least in part, from the perspective of the mobile device A 102 broadcasting expression codes with the mobile device B 104 operating in a discovery mode. The discovery mode can be configured in accordance with an "I am here" discovery model and/or a "who is there?/are you there?" discovery model, both of which are described in 3GPP TS 23.303 of Release 12, and therefore are not duplicated herein below in detail. In brief, the "I am here" discovery model utilizes announcing UEs and monitoring UEs. An announcing UE can announce certain information that could be of interest to other UEs in proximity that have permission to discover. A monitoring UE can monitor certain information of interest in proximity of announcing UEs. In this model, the announcing UE(s) broadcasts discovery message(s) at pre-defined discovery intervals (e.g., every 10 seconds) and the monitoring UE(s) that are interested in the discovery message(s) can read and process the message(s). In summary, the "who is there?/are you there?" discovery model utilizes a discoverer UEs and discoveree UEs. A discoverer UE can transmit a request message containing certain information of interest. A discoveree UE can receive the request message and can respond with some information related to the discoverer UE's request.

Figure 5:
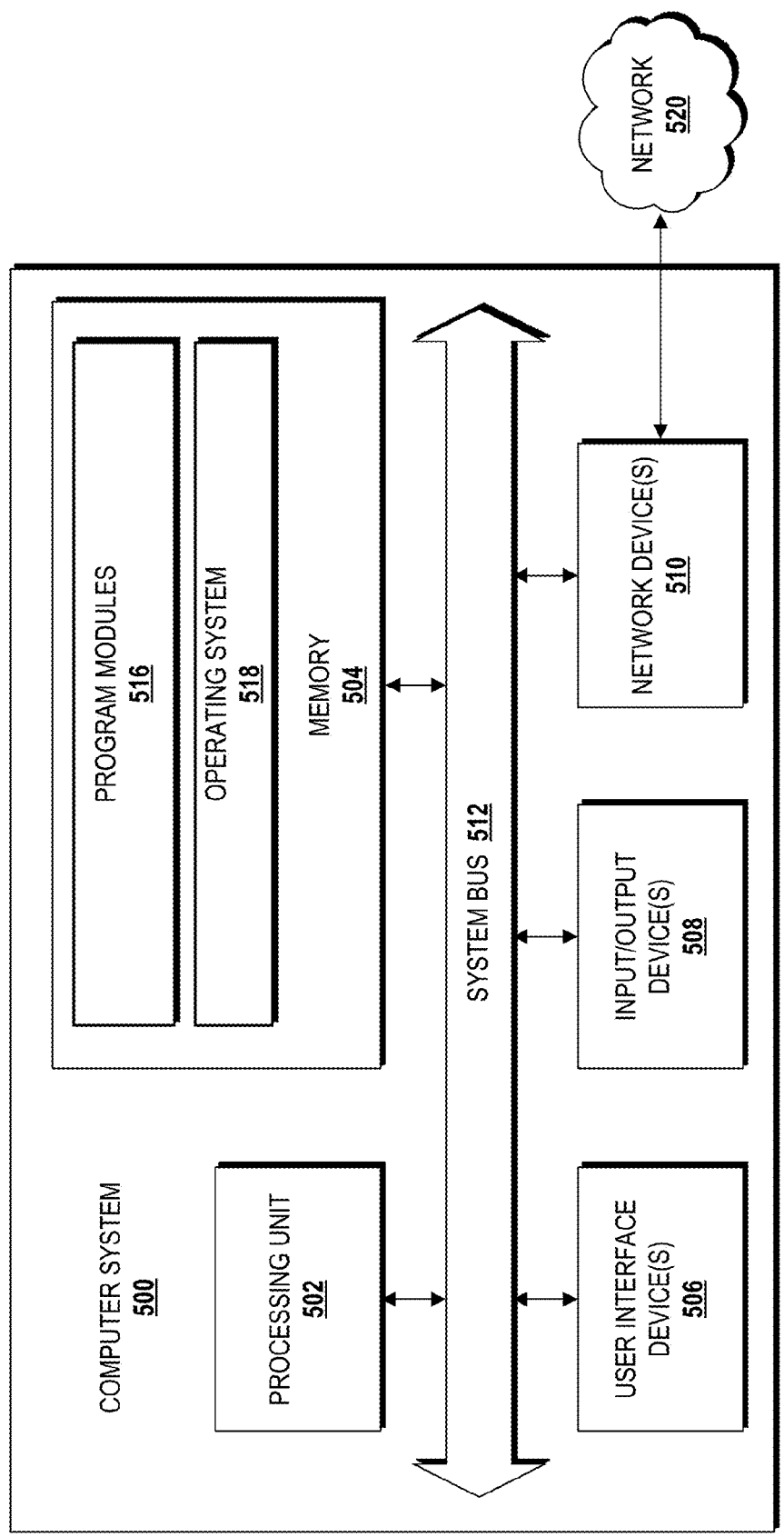
FIG. 5 is a block diagram illustrating an example computer system capable of implementing aspects of the embodiments presented herein.
Figure 6:
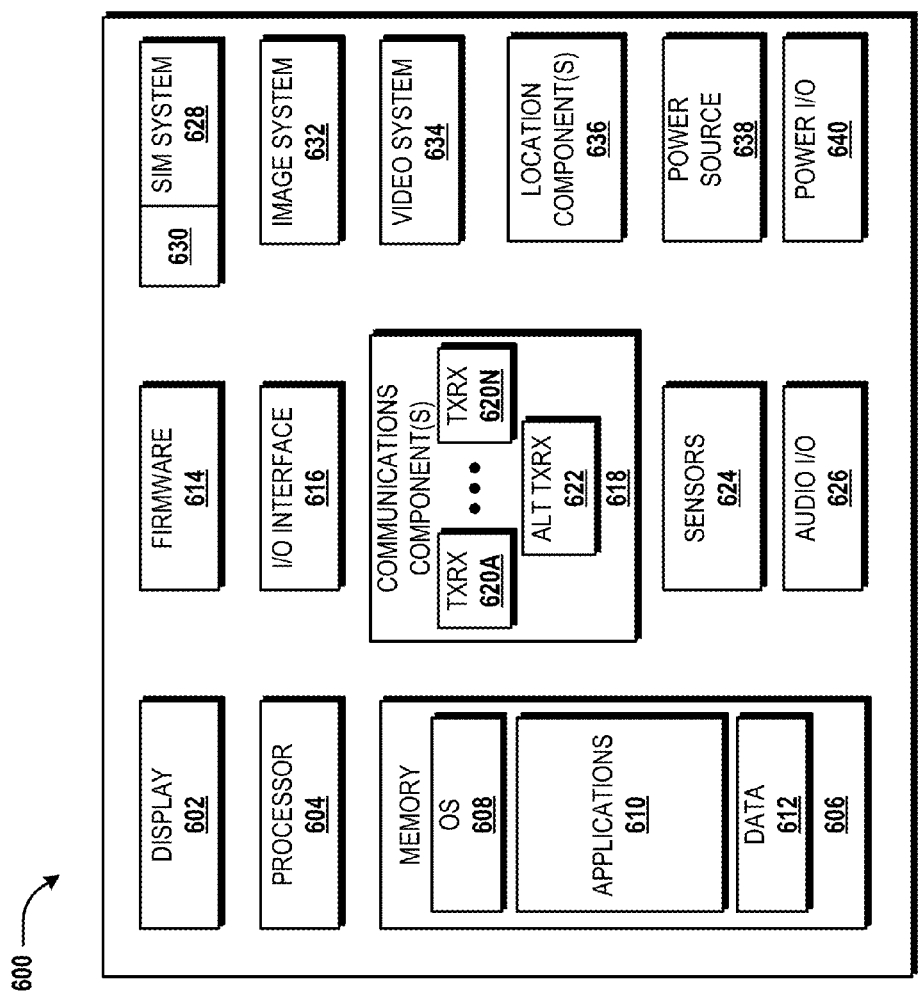
FIG. 6 is a block diagram illustrating an example mobile device capable of implementing aspects of the embodiments disclosed herein.

The method 300 includes operations performed by the mobile device A 102, the ProSe function 124, the expression application server 128, and the location platform 122 via execution, by one or more processors, of one or more software program modules or applications (best shown in FIGS. 1, 5, and 6). The method 300 will be described with additional reference to FIG. 1 and FIG. 2.

The method 300 begins and proceeds to operation 302, where the mobile device A 102 and the ProSe function 124 utilize LTE DIRECT to determine one or more proximity matches. From operation 302, the method 300 proceeds to operation 304, where the mobile device A 102, via execution of the ProSe application 106, generates an expression message, such as the expression message 204 introduced in FIG. 2. The expression message 204 can include one or more of the location tags 142, 142'. Also at operation 304, the mobile device A 102 sends the expression message 204 to the expression application server 128.

From operation 304, the method 300 proceeds to operation 306, where the expression application server 128 receives the expression message 204 and analyzes the expression message 204 to determine whether increased granularity is desired based upon the existence of and content of the location tag(s) 142, 142'. For example, the expression application server 128 can extract, from the expression message 204, the bit(s) from the expression code associated with the location tags 142, 142', whether added bit(s) or those earmarked for representing the location tag(s) 142, 142'. From operation 306, the method 300 proceeds to operation 308, where the expression application server 128 determines if a location difference is to be utilized to satisfy the increased granularity. If not, the method 300 proceeds to operation 310, where the expression application server 128 translates the expression code and provides expression match to the mobile device A 102. From operation 310, the method 300 proceeds to operation 312, where the method 300 ends.

If, however, at operation 308, the expression application server 128 determines a location difference is to be utilized to satisfy the increased granularity, the method proceeds to operation 314, where the expression application server 128 provides a location difference request, such as in the location difference request message 208, to the location platform 122. From operation 314, the method 300 proceeds to operation 316, where the location platform 122 receives the location difference request. Also at operation 316, the location platform 122 determines a location difference. The location platform 122 receives the location difference request message 208 from the expression application server 128 and determines the level of proximity, if applicable, to attempt to obtain for the expression application server 128 in response to the location difference request included in the location difference request message 208. The location platform 122 then utilizes one or more location protocols to obtain additional location information to satisfy the level of proximity, if applicable, identified in the location difference request message 208. The location platform 122 can utilize location protocols including, but are not limited to, LPP and SUPL, although other location protocols, including those assisted via GPS also are contemplated. Also at operation 316, after the location platform 122 obtains additional location information, the location platform 122 generates a location difference response message, such as the location difference response message 212 introduced in FIG. 2, that includes the additional location information, such as a location difference between the proximity provided by the ProSe function 124 and the location of the mobile device A 102 as identified by the location platform 122. The location platform 122 then provides the location difference in the location difference response message 212 to the expression application server 128.

From operation 316, the method 300 proceeds to operation 318, where the expression application server 128 enhances the expression match with the location difference. From operation 318, the method 300 proceeds to operation 310, where the expression application server 128 translates the expression code and provides expression match to the mobile device A 102. From operation 310, the method 300 proceeds to operation 312, where the method 300 ends.

Figure 4:
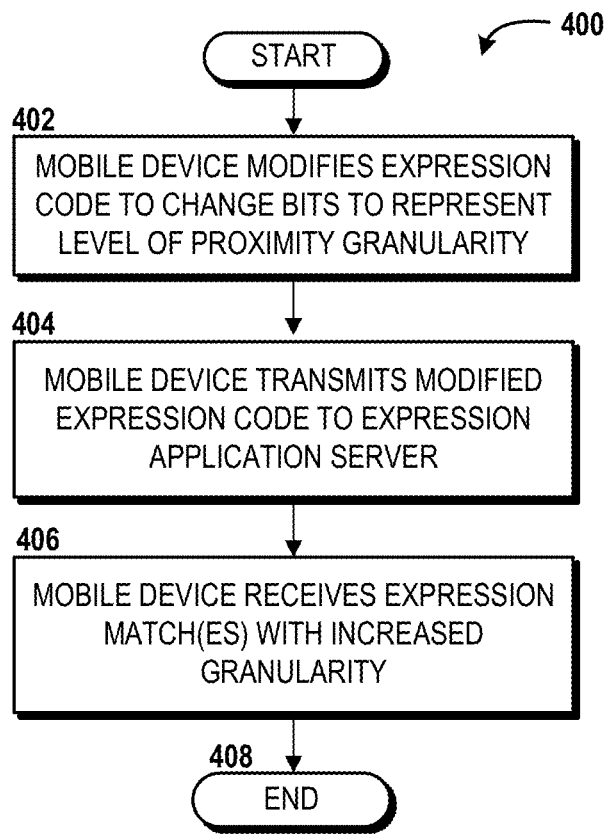
FIG. 4 is a flow diagram illustrating aspects of yet another method for modifying an expression code to request increased granularity for expression matches, according to an illustrative embodiment.

Turning now to FIG. 4, a flow diagram illustrating aspects of a method 400 for modifying an expression code to request increased granularity for expression matches will be described, according to an illustrative embodiment. The method 400 includes operations performed by the mobile device A 102 via execution of the ProSe APP A 106 by one or more processors (best shown in FIG. 6). It should be understood, however, that similar operations may be performed by other UEs, including, for example, the mobile device B 104. The method 400 will be described with additional reference to FIG. 1.

The method 400 begins and proceeds to operation 402, where the mobile device A 102 modifies an expression code, such as one of the restricted expression codes 136 and/or the open expression codes 140, to include one or more location tags, such as one or more of the location tags 142, 142'. In some embodiments, the location tags 142, 142' can be represented as additional bits added to the expression codes. For example, an additional "0" bit can be added to an expression code to indicate a "no" tag or an additional "1" bit can be added to an expression code to indicate a "yes" tag. As another example, an additional triplet of "000" can be added to an expression code to indicate that additional granularity is not needed; an additional triplet of "001" can be added to an expression code to indicate a first level of proximity of less than 100 meters; an additional triplet of "010" can be added to an expression code to indicate a second level of proximity of less than 50 meters; an additional triplet of "100" can be added to an expression code to indicate a third level of proximity of less than 10 meters; or an additional triplet of "101" can be added to an expression code to indicate a fourth level of proximity of less than 1 meter, and so on. In other embodiments, existing bits can be earmarked for representation of the location tags 142, 142' and can be changed in a manner similar to the new bits added in the previous embodiment.

From operation 402, the method 400 proceeds to operation 404, where the mobile device A 102 transmits the modified expression code to the expression application server 128. From operation 404, the method 400 proceeds to operation 406, where the mobile device A 102 receives one or more expression matches from the expression application server 128 that include the increased granularity specified in the modified expression code. From operation 406, the method 400 proceeds to operation 408, where the method 400 ends.

FIG. 5 is a block diagram illustrating a computer system 500 configured to provide the functionality in accordance with various embodiments of the concepts and technologies disclosed herein. In some implementations, the mobile device A 102, the mobile device B 104, components of the 3GPP RAN 110, components of the non-3GPP RAN 112, the S/PGW 116, the MME 118, the HSS 120, other components of the EPC 114, the ProSe function 124, the ProSe application server 126, the location platform 122, the expression application server 128, or any combination thereof can utilize an architecture that is the same as or similar to the architecture of the computer system 500, or a modified version thereof. It should be understood, however, that modification to the architecture may be made to facilitate certain interactions among elements described herein.

The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore are not described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 518 and one or more program modules 516. The operating system 518 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 516 may include various software and/or program modules to perform the various operations described herein. The program modules 516 and/or other programs can be embodied in computer-readable media containing instructions that, when executed by the processing unit 502, perform one or more of the methods 300, 400 or at least a portion thereof, described in detail above with respect to FIGS. 3-4, respectively. According to embodiments, the program modules 516 may be embodied in hardware, software, firmware, or any combination thereof.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network 520, which can include, for example, the 3GPP RAN 110, the non-3GPP RAN 112, and the EPC 114. Examples of the network devices 510 include, but are not limited to, a modem, a radio frequency ("RF") or infrared ("IR") transceiver, a telephonic interface, a bridge, a router, or a network card. The network 520 may include a wireless network such as, but not limited to, a wireless local area network ("WLAN"), a wireless wide area network ("WWAN"), a wireless personal area network ("WPAN") such as provided via BLUETOOTH technology, a wireless metropolitan area network ("WMAN") such as a WiMAX network or metropolitan cellular network. Alternatively, the network 520 may be a wired network such as, but not limited to, a wide area network ("WAN"), a wired LAN such as provided via Ethernet, a wired personal area network ("PAN"), or a wired metropolitan area network ("MAN").

Turning now to FIG. 6, an illustrative mobile device 600 and components thereof will be described. In some embodiments, the mobile device A 102 and the mobile device B 104 described above with reference to FIG. 1 can be configured as and/or can have an architecture similar or identical to the mobile device 600 described herein in FIG. 6. It should be understood, however, that the mobile device A 102 and the mobile device B 104 may or may not include the functionality described herein with reference to FIG. 6. While connections are not shown between the various components illustrated in FIG. 6, it should be understood that some, none, or all of the components illustrated in FIG. 6 can be configured to interact with one other to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 for displaying data. According to various embodiments, the display 602 can be configured to display various graphical user interface ("GUI") elements, text, images, video, advertisements, prompts, virtual keypads and/or keyboards, messaging data, notification messages, metadata, internet content, device status, time, date, calendar data, device preferences, map and location data, combinations thereof, and the like. The mobile device 600 also can include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608, one or more applications 610, other computer-executable instructions stored in a memory 606, or the like. In some embodiments, the applications 610 also can include a UI application (not illustrated in FIG. 6).

The UI application can interface with the operating system 608 to facilitate user interaction with functionality and/or data stored at the mobile device 600 and/or stored elsewhere. In some embodiments, the operating system 608 can include a member of the SYMBIAN OS family of operating systems from SYMBIAN LIMITED, a member of the WINDOWS MOBILE OS and/or WINDOWS PHONE OS families of operating systems from MICROSOFT COR- PORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user in entering content, viewing account information, answering/initiating calls, entering/deleting data, entering and setting user IDs and passwords for device access, configuring settings, manipulating address book content and/or settings, multimode interaction, interacting with other applications 610, and otherwise facilitating user interaction with the operating system 608, the applications 610, and/or other types or instances of data 612 that can be stored at the mobile device 600.

According to various embodiments, the applications 610 can include, for example, the ProSe APP A 106, the ProSe APP B 108, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 610, the data 612, and/or portions thereof can be stored in the memory 606 and/or in a firmware 614, and can be executed by the processor 604. The firmware 614 also can store code for execution during device power up and power down operations. It can be appreciated that the firmware 614 can be stored in a volatile or non-volatile data storage device including, but not limited to, the memory 606 and/or a portion thereof.

The mobile device 600 also can include an input/output ("I/O") interface 616. The I/O interface 616 can be configured to support the input/output of data such as location information, user information, organization information, presence status information, user IDs, passwords, and application initiation (start-up) requests. In some embodiments, the I/O interface 616 can include a hardware connection such as USB port, a mini-USB port, a micro-USB port, an audio jack, a PS2 port, an IEEE 1394 ("FIREWIRE") port, a serial port, a parallel port, an Ethernet (RJ64) port, an RJ11 port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 also can include a communications component 618. The communications component 618 can be configured to interface with the processor 604 to facilitate wired and/or wireless communications with one or more networks described above herein. In some embodiments, other networks include networks that utilize non-cellular wireless technologies such as WI-FI or WIMAX. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments one or more of the transceivers of the communications component 618 may be configured to communicate using GSM, CDMA, CDMAONE, CDMA2000, LTE, and various other 2G, 2.5G, 3G, 4G, and greater generation technology standards. Moreover, the communications component 618 may facilitate communications over various channel access methods (which may or may not be used by the aforementioned standards) including, but not limited to, TDMA, FDMA, W-CDMA, OFDM, SDMA, and the like.

In addition, the communications component 618 may facilitate data communications using GPRS, EDGE, the HSPA protocol family, including HSDPA, EUL, or otherwise termed HSUPA, HSPA+, and various other current and future wireless data access standards. In the illustrated embodiment, the communications component 618 can include a first transceiver ("TxRx") 620A that can operate in a first communications mode (e.g., GSM). The communications component 618 also can include an $N^{th}$ transceiver ("TxRx") 620N that can operate in a second communications mode relative to the first transceiver 620A (e.g., UMTS). While two transceivers 620A-N (hereinafter collectively and/or generically referred to as "transceivers 620") are shown in FIG. 6, it should be appreciated that less than two, two, and/or more than two transceivers 620 can be included in the communications component 618.

The communications component 618 also can include an alternative transceiver ("Alt TxRx") 622 for supporting other types and/or standards of communications. According to various contemplated embodiments, the alternative transceiver 622 can communicate using various communications technologies such as, for example, WI-FI, WIMAX, BLUETOOTH, infrared, IRDA, NFC, other RF technologies, combinations thereof, and the like.

In some embodiments, the communications component 618 also can facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 also can include one or more sensors 624. The sensors 624 can include temperature sensors, light sensors, air quality sensors, movement sensors, orientation sensors, noise sensors, proximity sensors, or the like. As such, it should be understood that the sensors 624 can include, but are not limited to, accelerometers, magnetometers, gyroscopes, infrared, noise sensors, microphones, combinations thereof, or the like. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 also can include a subscriber identity module ("SIM") system 628. The SIM system 628 can include a universal SIM ("USIM"), a universal integrated circuit card ("UICC") and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Because other devices and/or modules for identifying users and/or the mobile device 600 are contemplated, it should be understood that these embodiments are illustrative, and should not be construed as being limiting in any way.

The mobile device 600 also can include an image capture and processing system 632 ("image system"). The image system 632 can be configured to capture or otherwise obtain photos, videos, and/or other visual information. As such, the image system 632 can include cameras, lenses, charge-coupled devices ("CCDs"), combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to a multimedia message service ("MMS") message, email message, and sent to another mobile device. The video and/or photo content also can be shared with other devices via various types of data transfers via wired and/or wireless communication devices as described herein.

The mobile device 600 also can include one or more location components 636. The location components 636 can be configured to send and/or receive signals to determine a geographic location of the mobile device 600. According to various embodiments, the location components 636 can send and/or receive signals from GPS devices, A-GPS devices, WI-FI/WIMAX and/or cellular network triangulation data, combinations thereof, and the like. The location component 636 also can be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 also can include a power source 638. The power source 638 can include one or more batteries, power supplies, power cells, and/or other power subsystems including alternating current ("AC") and/or direct current ("DC") power devices. The power source 638 also can interface with an external power system or charging equipment via a power I/O component 640. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

Figure 7:
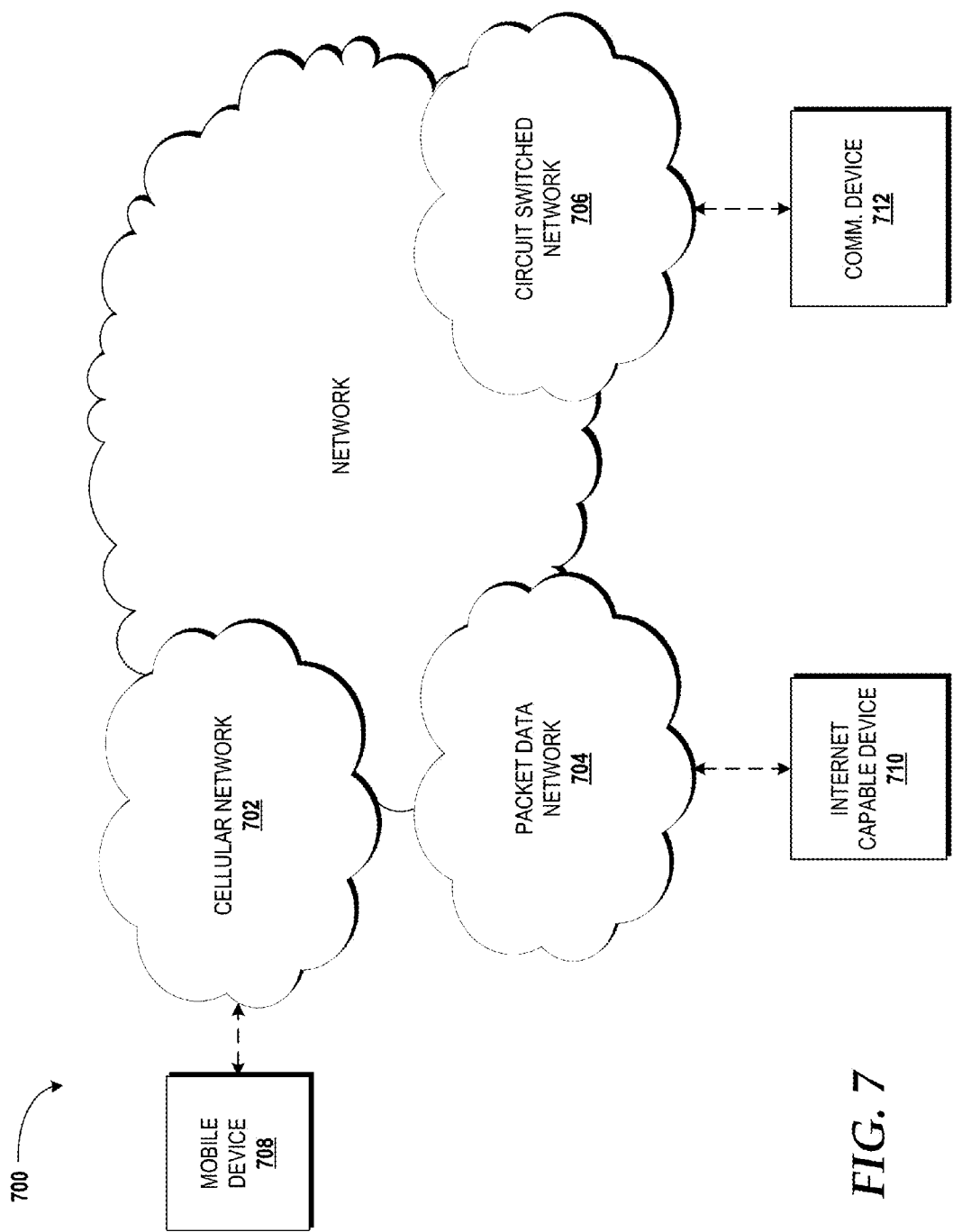
FIG. 7 schematically illustrates a network, according to an illustrative embodiment.

Turning now to FIG. 7, additional details of a network 700 are illustrated, according to an illustrative embodiment. The network 700 includes a cellular network 702, a packet data network 704, for example, the Internet, and a circuit switched network 706, for example, a publicly switched telephone network ("PSTN"). The cellular network 702 includes various components such as, but not limited to, RANs (e.g., the 3GPP RAN 110 and the non-3GPP RAN 112), BTSs, NodeBs or eNodeBs (e.g., the eNodeB), base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), the EPC 114 the other EPC functions, and the like. The cellular network 702 also includes radios and nodes for receiving and transmitting voice, data, and combinations thereof to and from radio transceivers, networks, the packet data network 704, and the circuit switched network 706.

A mobile communications device 708, such as, for example, a cellular telephone, a user equipment, a mobile terminal, a PDA, a laptop computer, a handheld computer, the mobile device A 102, the mobile device B 104, and combinations thereof, can be operatively connected to the cellular network 702. The cellular network 702 can be configured as a 2G GSM network and can provide data communications via GPRS and/or EDGE. Additionally, or alternatively, the cellular network 702 can be configured as a 3G UMTS network and can provide data communications via the HSPA protocol family, for example, HSDPA, EUL (also referred to as HSUPA), and HSPA+. The cellular network 702 also is compatible with 4G mobile communications standards such as LTE, or the like, as well as evolved and future mobile standards.

The packet data network 704 includes various devices, for example, servers, computers, databases, and other devices in communication with one another, as is generally known. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a plain old telephone system (POTS). The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable devices 710, for example, the mobile device A 102, the mobile device B 104, a PC, a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, the mobile device A 102, the mobile device B 104, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710. In the specification, the network 700 is used to refer broadly to any combination of the networks 702, 704, 706. It should be appreciated that substantially all of the functionality described with reference to the network 700 can be performed by the cellular network 702, the packet data network 704, and/or the circuit switched network 706, alone or in combination with other networks, network elements, and the like.

Based on the foregoing, it should be appreciated that concepts and technologies have been disclosed herein for improving location accuracy for proximity services. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

I claim:

1. A mobile device comprising:
   a processor; and
   memory that stores instructions that, when executed by the processor, cause the processor to perform operations comprising
   generating an expression message comprising an expression code, wherein the expression code comprises a location tag, and wherein the location tag identifies a specific proximity accuracy,
   sending the expression message to an expression application server that determines, based, at least in part, upon the location tag, an expression match to the expression code, and
   receiving, from the expression application server, the expression match with the specific proximity accuracy identified in the location tag.

2. The mobile device of claim 1, wherein the expression code comprises a restricted expression code.

3. The mobile device of claim 1, wherein the expression code comprises an open expression code.

4. The mobile device of claim 1, wherein the specific proximity accuracy comprises a level of proximity.

5. The mobile device of claim 4, wherein the level of proximity comprises a proximity of less than 100 meters.

6. The mobile device of claim 4, wherein the level of proximity comprises a proximity of less than 50 meters.

7. The mobile device of claim 4, wherein the level of proximity comprises a proximity of less than 10 meters.

8. The mobile device of claim 4, wherein the level of proximity comprises a proximity of less than 1 meter.

9. The mobile device of claim 1, wherein the operations further comprises modifying at least one bit of a plurality of bits within the expression code to include the location tag.

10. The mobile device of claim 1, wherein the operations further comprise adding at least one bit to a plurality of bits within the expression code, wherein the at least one bit represents the location tag.

11. A method comprising:
    generating, by a mobile device comprising a processor, an expression message comprising an expression code, wherein the expression code comprises a location tag, and wherein the location tag identifies a specific proximity accuracy;
    sending, by the mobile device, the expression message to an expression application server that determines, based, at least in part, upon the location tag, an expression match to the expression code; and
    receiving, by the mobile device, from the expression application server, the expression match with the specific proximity accuracy identified in the location tag.

12. The method of claim 11, wherein the expression code comprises a restricted expression code.

13. The method of claim 11, wherein the expression code comprises an open expression code.

14. The method of claim 11, wherein the specific proximity accuracy comprises a level of proximity comprising a proximity of less than 100 meters, a proximity of less than 50 meters, a proximity of less than 10 meters, or a proximity of less than 1 meter.

15. The method of claim 11, further comprising modifying, by the mobile device, at least one bit of a plurality of bits within the expression code to include the location tag.

16. The method of claim 11, further comprising adding, by the mobile device, at least one bit to a plurality of bits within the expression code, wherein the at least one bit represents the location tag.

17. A computer-readable storage medium having computer-readable instructions stored thereon that, when executed by a processor of a mobile device, cause the mobile device to perform operations comprising:
    generating an expression message comprising an expression code, wherein the expression code comprises a location tag, and wherein the location tag identifies a specific proximity accuracy;
    sending the expression message to an expression application server that determines, based, at least in part, upon the location tag, an expression match to the expression code; and
    receiving, from the expression application server, the expression match with the specific proximity accuracy identified in the location tag.

18. The computer-readable storage medium of claim 17, wherein the expression code comprises a restricted expression code or an open expression code.

19. The computer-readable storage medium of claim 17, wherein the operations further comprise modifying at least one bit of a plurality of bits within the expression code to include the location tag.

20. The computer-readable storage medium of claim 17, wherein the operations further comprise adding at least one bit to a plurality of bits within the expression code, wherein the at least one bit represents the location tag.

* * * * *